United States Patent [19]
Gadea Mantilla

[11] Patent Number: 5,179,876
[45] Date of Patent: Jan. 19, 1993

[54] DEVICE FOR ROTARY TORQUE ENHANCEMENT

[76] Inventor: Carlos E. Gadea Mantilla, Apartado 2442, Managua, Nicaragua

[21] Appl. No.: 678,658

[22] Filed: Apr. 10, 1991

[51] Int. Cl.⁵ ............................................. B25B 17/00
[52] U.S. Cl. .................................. 81/57.3; 92/57.14; 92/57.24
[58] Field of Search ................ 81/57.14, 57.22, 57.24, 81/57.3, 57.4

[56] References Cited

U.S. PATENT DOCUMENTS

| | | | |
|---|---|---|---|
| 3,905,254 | 9/1975 | Palatnick et al. | 81/57.3 |
| 4,063,475 | 12/1977 | Perkins | 81/57.3 X |
| 4,274,310 | 6/1981 | Michaud | 81/57.3 X |

FOREIGN PATENT DOCUMENTS 2807944 8/1979 Fed. Rep. of Germany ....... 81/57.3

Primary Examiner—James G. Smith
Attorney, Agent, or Firm—John F. Sieberth

[57] ABSTRACT

The device transmits and mechanically amplifies input torque into increased output torque to facilitate such chores as tightening or loosening wheel lug nuts, and cranking a rotary mechanical jack. When used to tighten or loosen a wheel lug nut, the device is preferably anchored in place by attachment to a wheel lug nut other than the lug nut being tightened or loosened. When used to crank a mechanical jack, the device is preferably anchored in place by use of a crank handle, and the device is operated by use on an auxiliary crank. The inptut torque to the device can be supplied by hand or by an electric motor operated by battery power transmitted via a plug fitted into the socket of a cigarette lighter. The device is compact and can be readily used, even by physically weak or infirm persons.

12 Claims, 12 Drawing Sheets

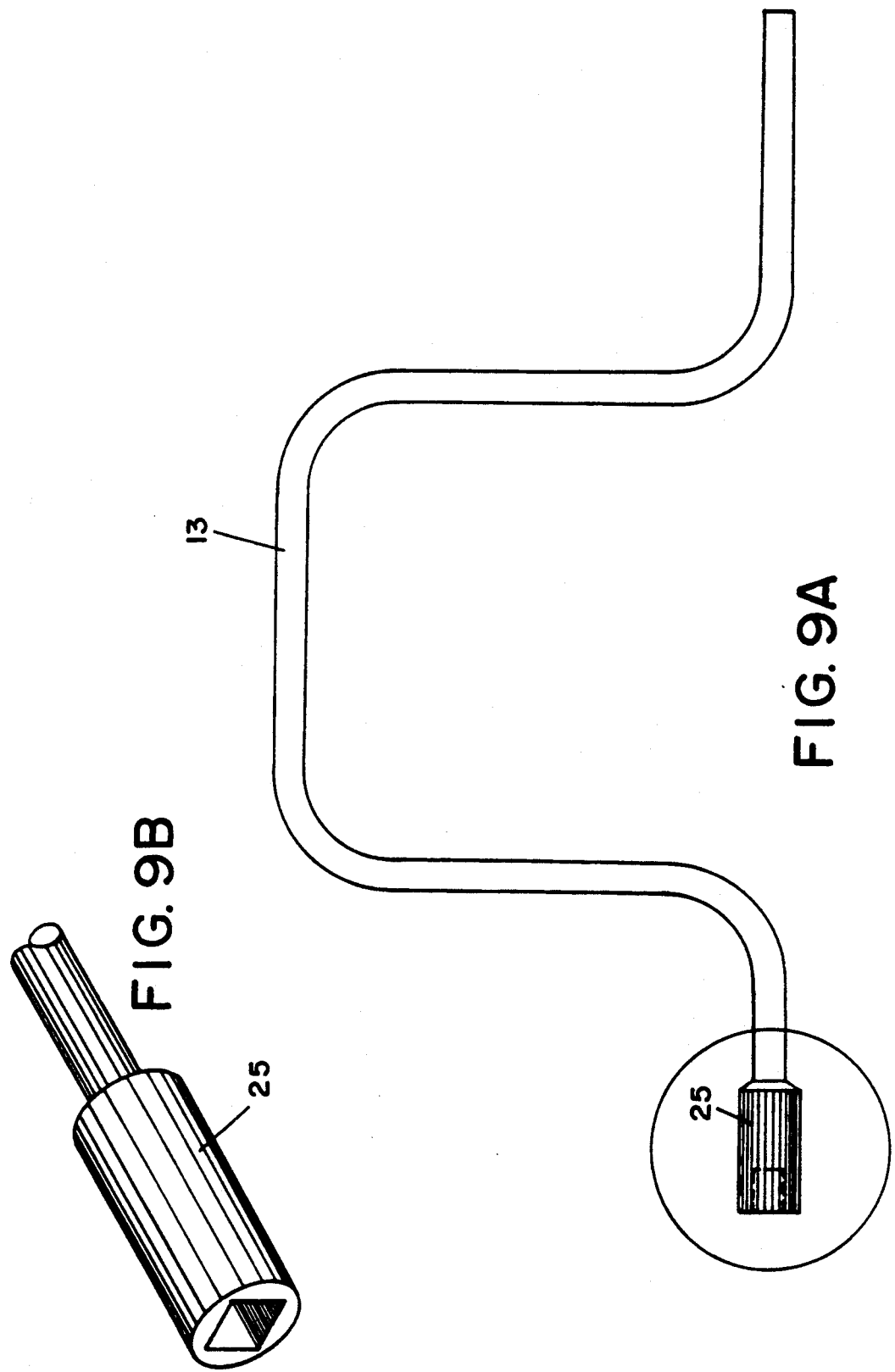

DEVICE FOR ROTARY TORQUE ENHANCEMENT

TECHNICAL FIELD

This invention relates to a device for transmitting and amplifying torque by mechanical means.

BACKGROUND

Many situations exist wherein it is necessary to apply rotary force to a rotatable object. For example, to loosen or tighten a threaded fastening member such as a bolt, nut or cap screw, a wrench is commonly employed. Similarly, to utilize a rotary type mechanical jack, a crank handle with a suitable connector is commonly employed. Devices such as these, while workable, frequently require the application of considerable muscular force, as for example when seeking to jack up an automobile with a rotary mechanical jack or when seeking to loosen the lug nuts on the wheel of the vehicle in order to replace a worn or flat tire. The need for conducting tasks such as these can occur at inopportune times and places, and the person involved, if muscularly weak or infirm, may be unable to apply the manual force necessary to do the job. And in any event, why should one strain himself or herself, if the task can be accomplished much more easily?

THE INVENTION

An object of this invention, therefore, is to provide a device which transmits and amplifies torque by mechanical means.

Another object is to provide a compact mechanical device for increasing rotary torque such that modest input torque can be translated into substantially increased output torque.

These and other objects of this invention can be accomplished in accordance with the means and methods described hereinbelow.

In one of its embodiments this invention provides a device or tool adapted for increasing rotary torque, which device comprises (a) gearing adapted to receive and amplify an input rotary torque, and to provide a amplified output rotary torque; (b) means for applying input rotary torque to said gearing; (c) means for delivering amplified output rotary torque from said gearing to an object to be rotated; and (d) means for anchoring the device in one or more operating spatial positions during application of the input rotary torque. When the device is used for loosening or tightening wheel lugs, the device is anchored to the wheel or a portion thereof, and preferably is anchored onto a wheel lug other than the lug being loosened or tightened. When the device is used for operating a rotary mechanical jack, the device is anchored to the supporting surface such as the floor, ground, pavement, etc., proximate to the jack, preferably by means of the user's foot, as will be explained hereinafter.

Just as a boat or ship when anchored is able to move within fixed limits to accommodate wind, tide and/or current changes, the device of this invention, when anchored, is nonetheless capable of controlled or limited spatial movement. Thus when anchored to the wheel or a portion thereof such as a wheel lug other than the lug being loosened or tightened, the device preferably is at liberty to move outwardly or inwardly to the extent necessary to accommodate the spatial change of position of the wheel lug as it is screwed away from or toward the wheel. Alternatively, use is made of a socket encasing the wheel lug being rotated in or out, which socket is deep enough to allow limited inward or outward travel of the lug within the socket whereby the device itself can thereby remain in a substantially fixed spatial position.

When used to operate a rotary mechanical jack, the device of this invention, although anchored onto the supporting surface may require a limited degree of spatial movement in order to accommodate the upward or downward travel of the connection to the jack as the jack is being raised or lowered by cranking action. The extent of such spatial movement, if any, will be dependent in any given situation by the configuration of the rotary jack itself.

In a preferred embodiment of this invention the means of (d) above—i.e., the means for anchoring the device in one or more operating spatial positions during application of the input rotary torque—is detachably attachable to an arm which is pivotally supported on the device such that the linear distance between such detachable attachment and the axis of rotation of the object to be rotated is adjustable.

In another of its preferred embodiments this invention provides a device or tool adapted for increasing rotary torque, which device comprises (a) a first gear wheel adapted to receive an input rotary torque; (b) a second gear wheel and a third gear wheel mounted on a shaft and adapted to rotate in unison therewith; (c) a fourth gear wheel adapted to deliver an output rotary torque; and (d) means for anchoring the device in at least one operating position during application of such input rotary torque, which device is further characterized in that (e) the second gear wheel is adapted to be rotated by torque from the first gear wheel and has a larger diameter than the first gear wheel; and (f) the fourth gear wheel is adapted to be rotated by torque from the third gear wheel and has a larger diameter than the third gear wheel. In a particularly preferred embodiment, the second gear wheel has a larger diameter than the third gear wheel.

The foregoing device is well suited for use in loosening and tightening the wheel lugs of automotive vehicles such a automobiles, trucks, vans, buses and the like. The device is also well suited for use in operating rotatable mechanical jacks for automotive vehicles. These functions can be readily conducted even by persons of limited physical strength because of the amplification of torque generated by the gearing of the device.

As noted above, the fourth gear wheel is adapted to deliver an output rotary torque. Although other means can be used, it is preferred to connect the fourth gear wheel to an axially disposed socket (for ease of reference, sometimes referred to hereinafter as "output socket") projecting rearwardly from the device so that rotary force delivered to the fourth gear wheel is in turn transmitted to the output socket. The connection between the fourth gear wheel and the output socket can be detachable or non-detachable, and direct or indirect. Use of a common shaft to which both the fourth gear wheel and the output socket are attached is a typical way of effecting an indirect connection. Another way of effecting such indirect connection is to utilize additional gearing between the fourth gear wheel and the output socket in order to cause the former to rotate the latter. The output socket is sized and shaped to fit over the wheel lug of the vehicle or the end of the rotary shaft of the mechanical jack to be rotated by the device. Thus by providing a detachably attachable connection between the output socket and the fourth gear wheel, a plurality of interchangeable, differently-sized output sockets can be provided and utilized for accommodating differently-sized wheel lugs and/or rotary jacks.

The means for anchoring the device during application of the input rotary torque to the first gear wheel can be of various types, such as for example a stand of adjustable height, or clamps adapted to fit onto the rim or axle hub of an automotive wheel. However, preferred means for anchoring the device in suitable operating position during use is comprised of a socket or clamp (for ease of reference, sometimes referred to hereinafter as "holding socket") affixed to the device and disposed thereon such that the holding socket can be detachably attached to a lug of an automotive wheel other than the lug of that wheel to be loosened or tightened by the device. Thus the holding socket projects rearwardly from the device as does the output socket connected with and driven by the fourth gear wheel.

In one embodiment the holding socket is secured to the device in a fixed position and separated from the output socket by a fixed distance equivalent to the fixed distance between a pair of wheel lugs of a given vehicle. In addition, the holding socket and the output socket (if only one is provided) or one of the output sockets (if a plurality of sockets are provided) have the same internal configuration and size so that they can fit over and accommodate the same sized lug. In this embodiment, the device is adapted for use with that particular make or model of vehicle plus any other types, makes or models of vehicles that may have the same wheel lug spacing and size. Such devices are especially desirable for use as an automotive accessory of the type furnished with newly purchased vehicles.

In another embodiment the holding socket is secured to the device in adjustable positions s that the distance between the holding socket and the equivalently-sized output socket can be varied to accommodate various distances between a pair of wheel lugs on any of a variety of different vehicles. In addition, the holding socket and the output socket are preferably detachably attachable to the device so that although of the same internal size, they both can be selected from among pairs of differently-sized sockets for use with vehicles of different lug sizes. In this embodiment, the device is adapted for use with various types, makes or models of vehicles, and thus these devices are especially desirable for use in automotive or tire sales, service or repair shops, filling stations, and the like.

As noted above, the first gear wheel is adapted to receive an input rotary torque. This can originate by use of various means. For example, the input torque can be applied by means of a simple hand crank rotated by the user, which crank is preferably detachably attachable to the first gear wheel. A desirable arrangement of this type comprises a lug or key axially disposed from the face of the first gear wheel, and a matching socket disposed at the end of a crank handle, brace or other instrument operated with a crank motion. Such lug or key thus projects forwardly from the device. In another preferred embodiment the input torque to the first gear wheel is supplied by a motor which is detachably attachable to the first gear wheel such as by means of socket sized to fit a lug or key axially disposed from the face of the first gear wheel or by means of one or more gears which can be detachably engaged with the cogs of the first gear wheel to cause rotation thereof. In any such instance, the electric motor is most preferably one that can be operated by means of current derived from a portable supply of electricity such as a storage battery or the like. Thus when using the device of this invention to loosen or tighten the wheel lugs of an automotive vehicle or to operate a rotary operated mechanical jack, the motor can be connected to the battery either through a plug that fits into the cigarette lighter socket of the vehicle or through extension cables that can be clamped onto the respective battery terminals.

In accordance with another preferred embodiment, the gearing of the device consists of the aforesaid four gear wheels and these gear wheels are disposed such that the first and the fourth gear wheels are in axial alignment or at least are in relatively close axial alignment with each other, but in any case are independently rotatable in the sense that the input rotary torque received by the first gear wheel is transmitted to the fourth gear wheel only through the second and third gear wheels which rotate in unison. In other words, the first and the second gear wheels are in engagement with each other, and the third and fourth gear wheels are in engagement with each other. Consequently the transmission and amplification of the input torque proceeds by transmission of rotary forces from the first gear wheel to the second gear wheel, thence to the shaft or axle shared by the second and third gear wheels, thence to the third gear wheel, and thence to the fourth gear wheel. Not only is the torque significantly increased by this arrangement, but in addition the direction of the rotation of the first gear wheel results in rotation of the fourth gear wheel in the same direction. Thus the user can simply cause the first gear wheel to rotate in the direction (clockwise or counterclockwise) that the object (e.g., lug nut) is to be rotated, and the object will thereby be rotated in that direction. Moreover, this preferred arrangement is compact inasmuch as the four gear wheels are disposed in a rectangular configuration with the first and second gear wheels side by side in the front row, and the third and fourth gear wheels side by side in the second row, behind but proximate to the first row. Thus such device is easy to store, easy to carry, and easy to use.

It is possible, if desired, to interpose idler gear wheels in the gear train, as for example between the first and second gear wheels, and/or between the third and fourth gear wheels. Likewise it is possible to place additional gearing ahead of the first gear wheel and/or behind (i.e., downstream from) the fourth gear. But such add-ons are unecessary, and in most cases would merely add expense and complexity to an otherwise highly efficient gearing system which performs its intended functions most expeditiously and efficiently.

The above and other features of this invention will be still further apparent from a consideration of the ensuing description, appended claims, and accompanying drawings.

THE DRAWINGS

FIG. 9 is a side view of a crank for use with the device of FIG. 1.

Figure 1:
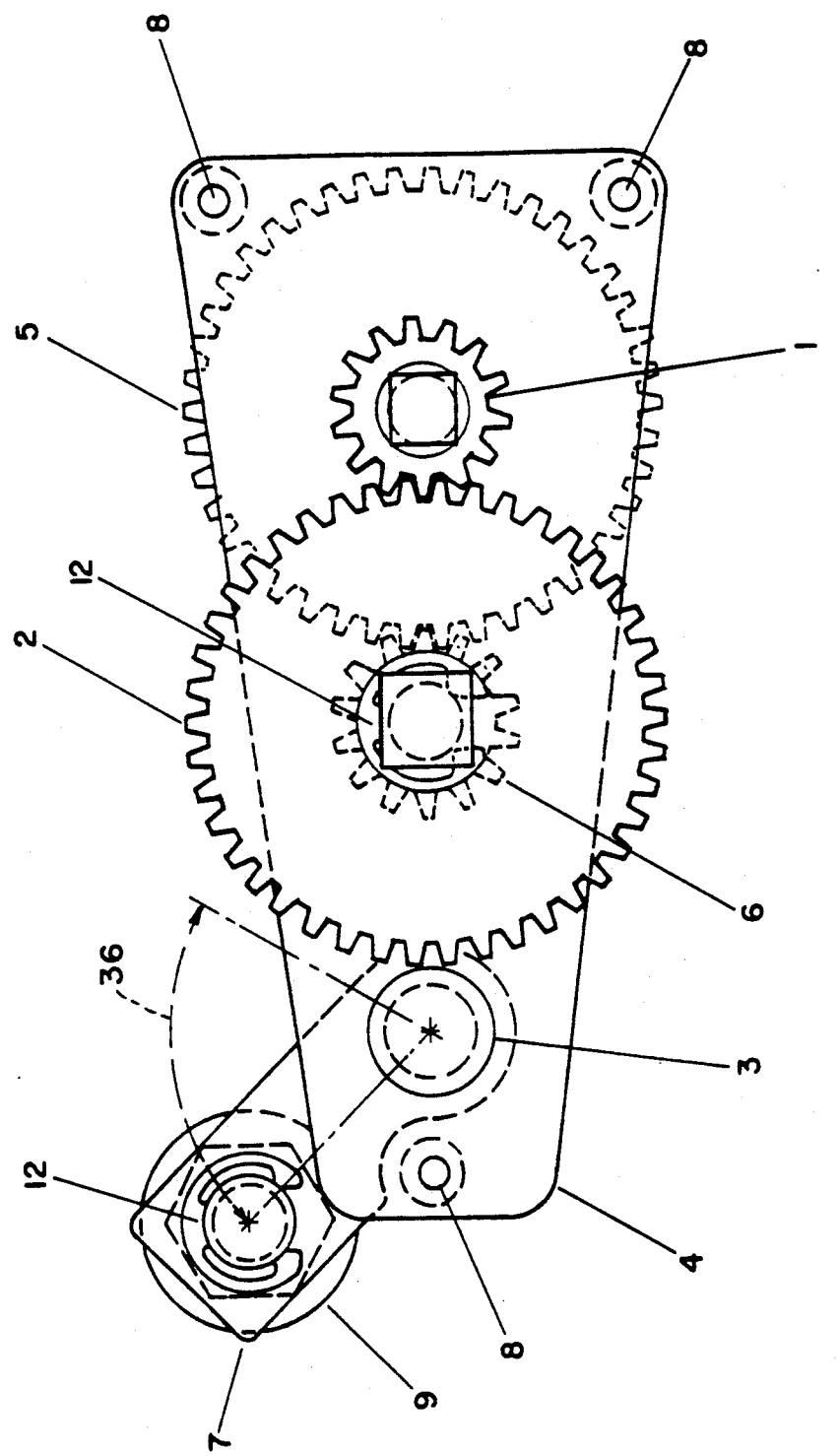
FIG. 1 is a front view of a preferred device of this invention.
Figure 2:
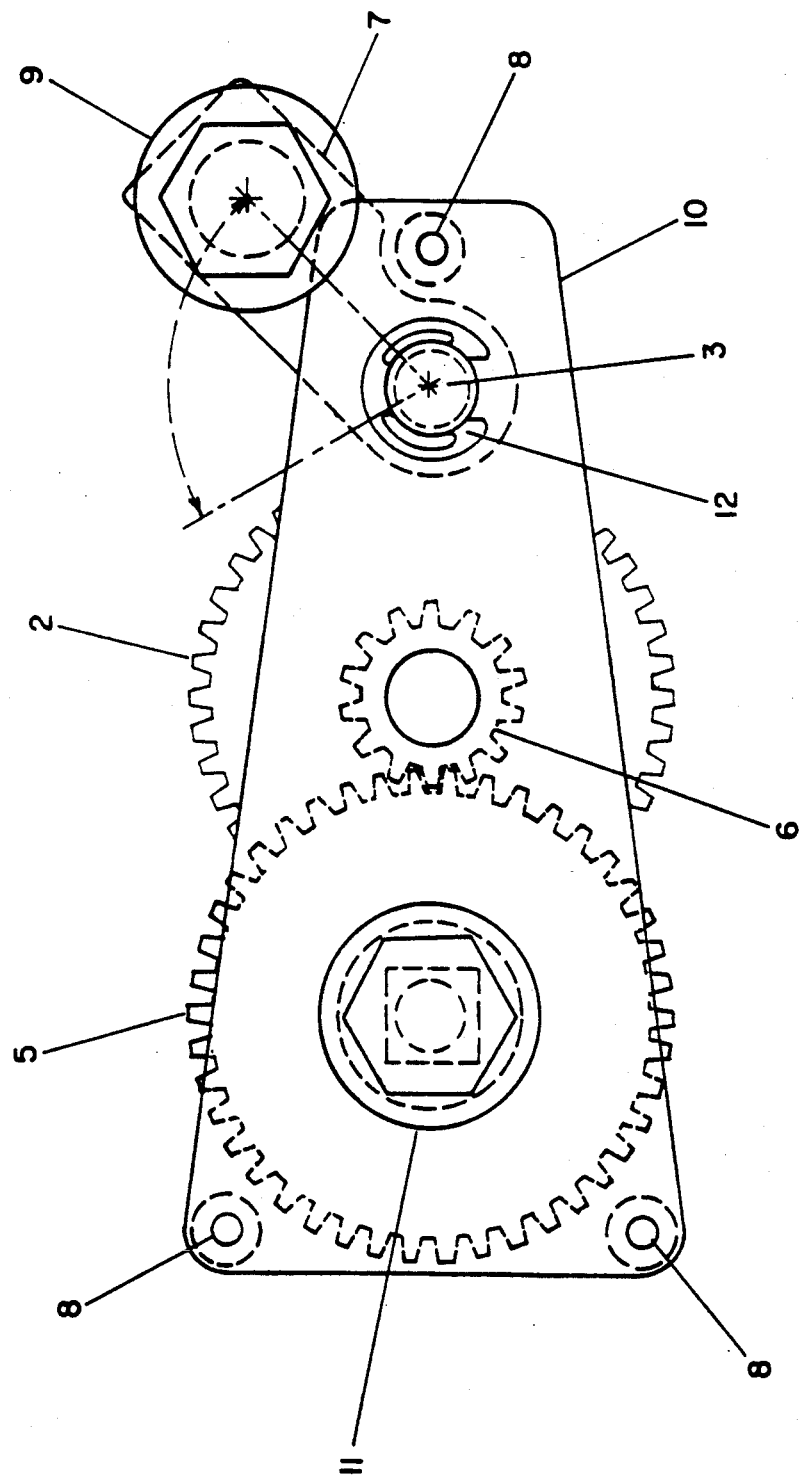
FIG. 2 is a rear view of the device of FIG. 1.

In the drawings like numerals represent like parts among the various figures. In several of the drawings as filed herewith dimensions are set forth. It is to be understood and appreciated that this invention is not intended to be limited in any way, and should not be limited in any way, by such dimensions. Nor should this invention be limited to the particular type of devices depicted in the drawings. The drawings are presented in order to illustrate the subject matter of this invention, and the dimensions thereon are presented in the exercise of a super-abundance of caution to insure compliance with the best mode requirement of Section 112 of Title 35 of the United States Code.

FURTHER DESCRIPTION

Referring now to the drawings, the devices in the forms depicted include a gearing system composed of first gear wheel 1, second gear wheel 2, third gear wheel 6, and fourth gear wheel 5. Gear wheel 1 is mounted on shaft 14. Gear wheels 1 and 5 are axially aligned, but gear wheel 5 is free to rotate independently of gear wheel 1 and shaft 14. That is, gear wheel 5 does not rotate in unison with shaft 14. Gear wheels 2 and 6 are axially aligned and mounted on shaft 15 so that they will rotate in unison. In the preferred form depicted, the diameters of gear wheels 2 and 5 are equal to each other, the diameters of gear wheels 1 and 6 are equal to each other, gear wheels 1 and 5 are in axial alignment, and gear wheels 2 and 6 are in axial alignment. However the diameters of gear wheels 2 and 5 can differ from each other, as can the diameters of gear wheels 1 and 6, provided that the diameter of gear wheel 2 is greater than that of gear wheel 1, and the diameter of gear wheel 5 is greater than that of gear wheel 6, as this provides the amplification of the torque produced by the device.

Figure 5C:
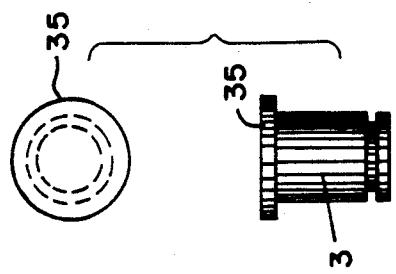
FIGS. 5 through 8 depict the various parts of the device of FIG. 1, and as filed herewith set forth dimensions thereof.
Figure 5B:
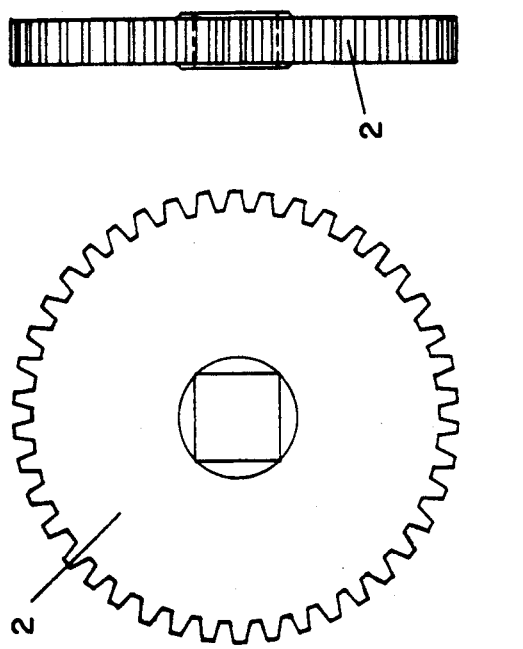
Figure 5A:
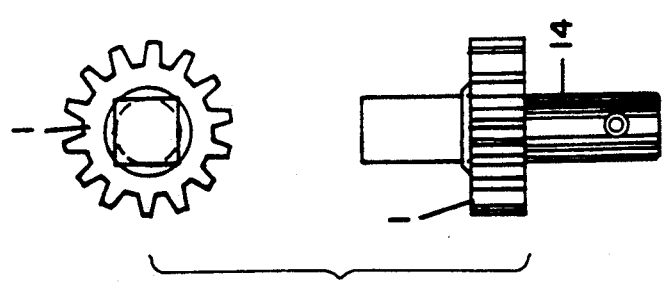
Figure 6A:
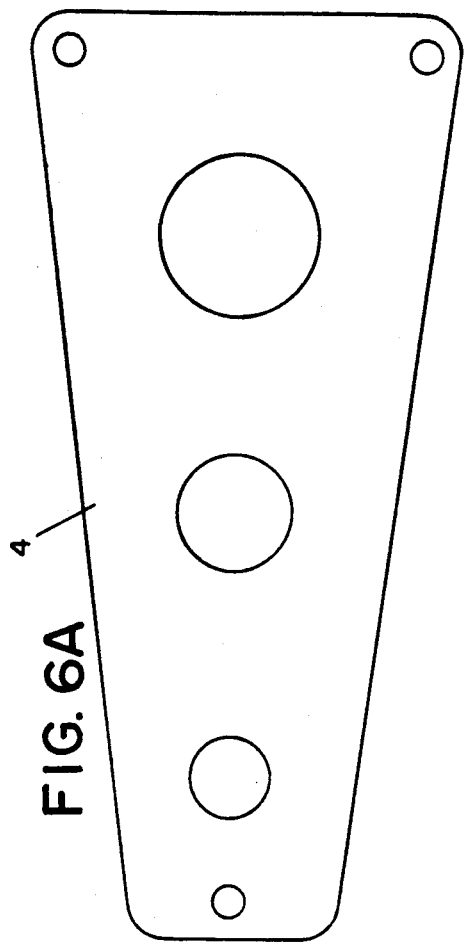
Figure 6C:
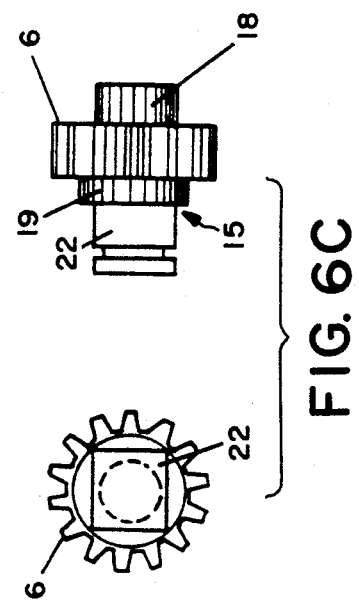
Figure 6B:
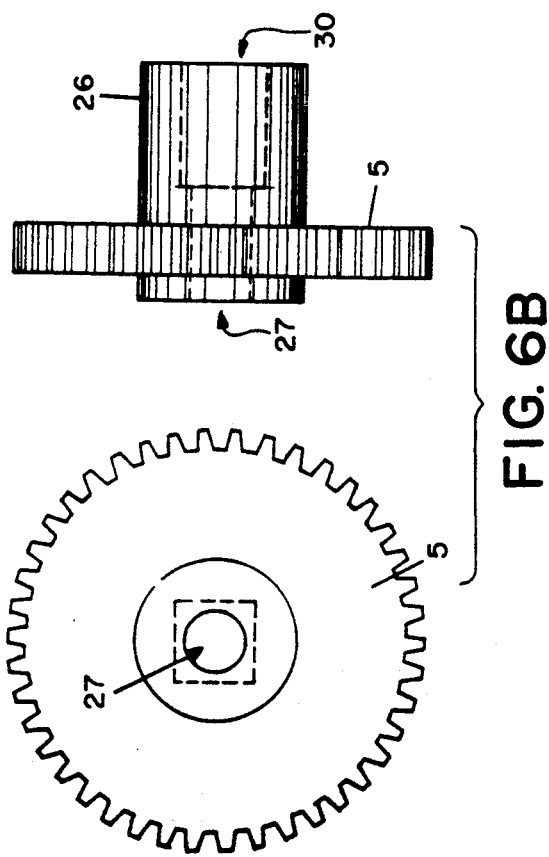
Figure 7C:
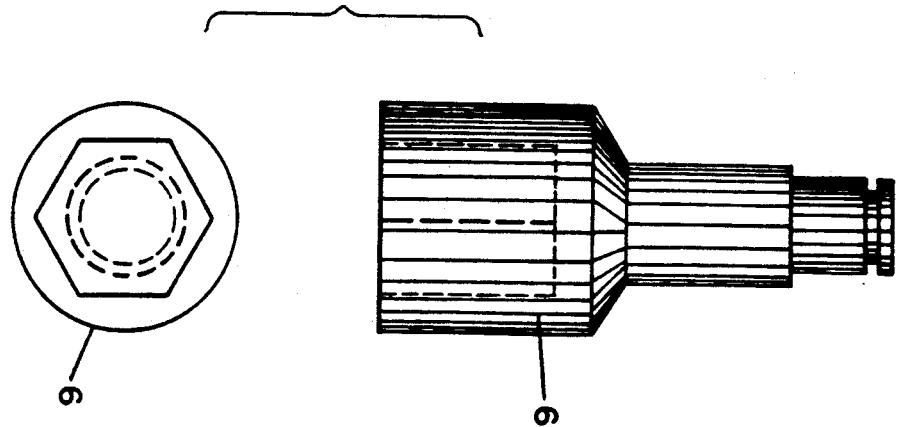
Figure 7B:
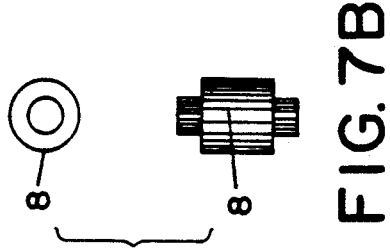
Figure 7A:
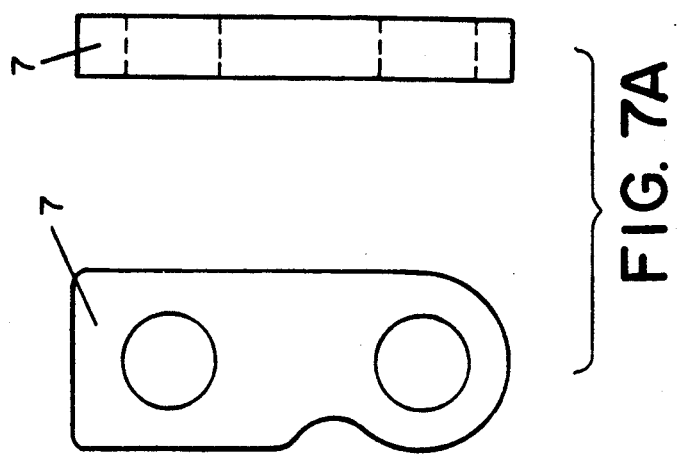
Figure 8B:
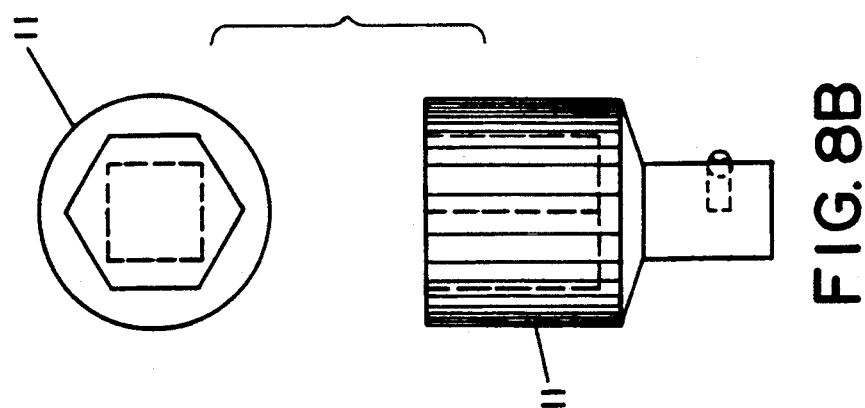
Figure 8A:
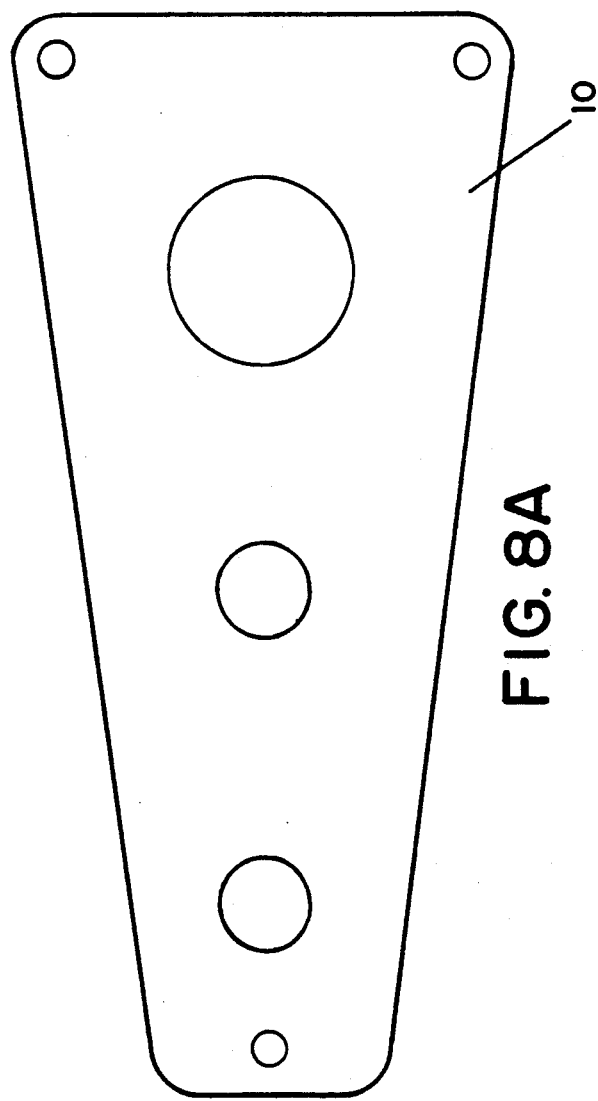

As best seen in FIG. 5, gear wheel 1 is attached to shaft 14 intermediate its ends, and as best seen in FIG. 6, gear wheel 5 is attached to a larger diameter hollow shaft 26 having a forward cylindrical recess 27 therein sized to accommodate and to permit free rotation therein of the rearward portion of shaft 14. The rearward portion of shaft 26 has a larger sized recess 30 to accommodate and rotate detachably attachable output socket 11 which in turn is detachably secured onto the item to be rotated such as a wheel lug.

As best seen in FIG. 6, gear wheel 6 is attached to shaft 15 intermediate its ends, and shaft 15 has a rearward cylindrical portion 18 and an intermediate rim or shoulder portion 19. From FIGS. 4 and 6 it is seen that the forward portion 22 of shaft 15 is squared or otherwise keyed so that this portion fits into and connects with gear wheel 2 whereby rotation of gear wheel 2 causes shaft 15 and gear wheel 6 to rotate in unison therewith.

Gear wheels 1, 2, 5, and 6 are mounted on and held in working relationship by a body assembly composed of front plate 4 and back plate 10 held together in generally parallel spaced-apart relationship by a plurality of suitably disposed rivets 8,8,8. Gear wheels 1 and 2 are disposed in front of plate 4, and gear wheels 5 and 6 are disposed between plates 4 and 10. Aperture 16 in plate 4 is sized so that wall 17 defining aperture 16 matches and serves as a bearing surface for a forward portion of shaft 26 disposed therein. Similarly, aperture 20 in plate 10 is sized so that wall 21 defining aperture 20 matches and serves as a bearing surface for a rearward portion of shaft 26 disposed therein.

Aperture 23 in plate 4 is sized so that wall 24 defining aperture 23 matches and serves as a bearing surface for rim or shoulder portion 19 of shaft 15 disposed therein. Similarly, aperture 28 in plate 10 is sized so that wall 29 defining aperture 28 matches and serves as a bearing surface for rearward portion 18 of shaft 15 disposed therein.

Apertures 16 and 23 are thus positioned such that gear wheels 1 and 2 are engaged with each other whereby rotation of gear wheel 1 causes rotation of gear wheel 2. Likewise, apertures 20 and 28 are thus positioned such that gear wheels 5 and 6 are engaged with each other whereby rotation of gear wheel 6 causes rotation of gear wheel 5.

Figure 4:
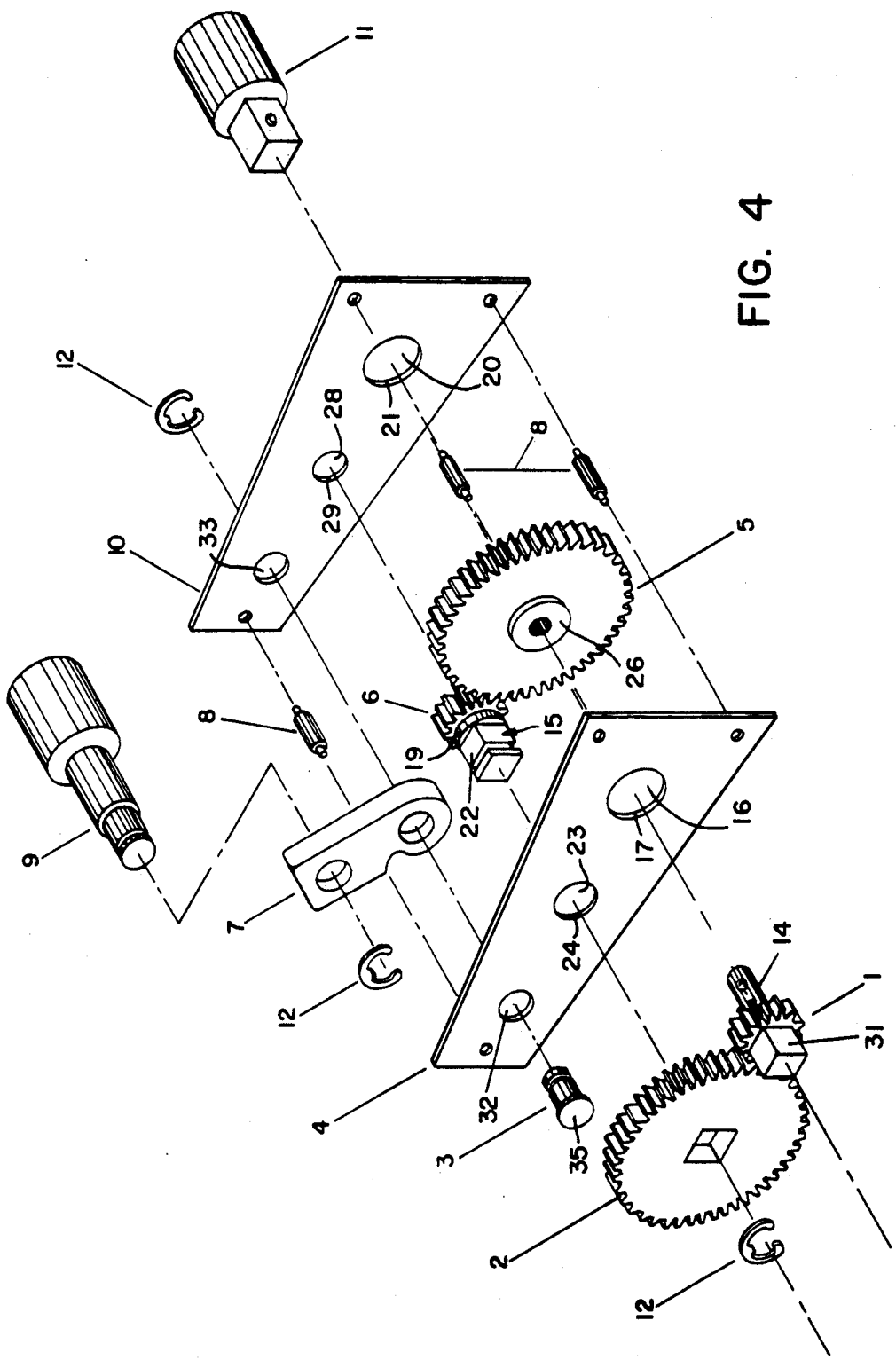
FIG. 4 is an exploded isometric view of most of the device of FIG. 1, some portions having been eliminated for ease of viewing.

From FIGS. 4 and 6 it can be seen that forward portion 22 of shaft 15 is transversely grooved near its forward end to receive a retainer 12. This or equivalent means such a cotter pin is used in order to keep shaft 15 and the gear assemblies mounted thereon in proper position in the device.

In the system depicted, input torque to rotate gear wheel 1 is applied by socket 25 of crank 13 detachably fitted onto matching sized lug 31 on the front of gear wheel 1. However as noted above, socket 25 may be caused to rotate by means of an electric motor (not shown) operated by battery power, for example via electrical connection involving insertion of a suitably configured electrical plug into a conventional cigarette lighter socket.

As noted above, the device also includes means for anchoring the device in a suitable position during application of an input rotary torque to rotate gear wheel 1. In the preferred form depicted, these means utilize a holding socket, the position of which can be arcuately adjusted so as to enable the device to be used with vehicles having their respective wheel lugs differently spaced from each other. It will be recalled however that the position of the holding socket can be non-adjustable, and indeed, that other constructions or mechanical means can be utilized for anchoring the device during use.

Figure 3:
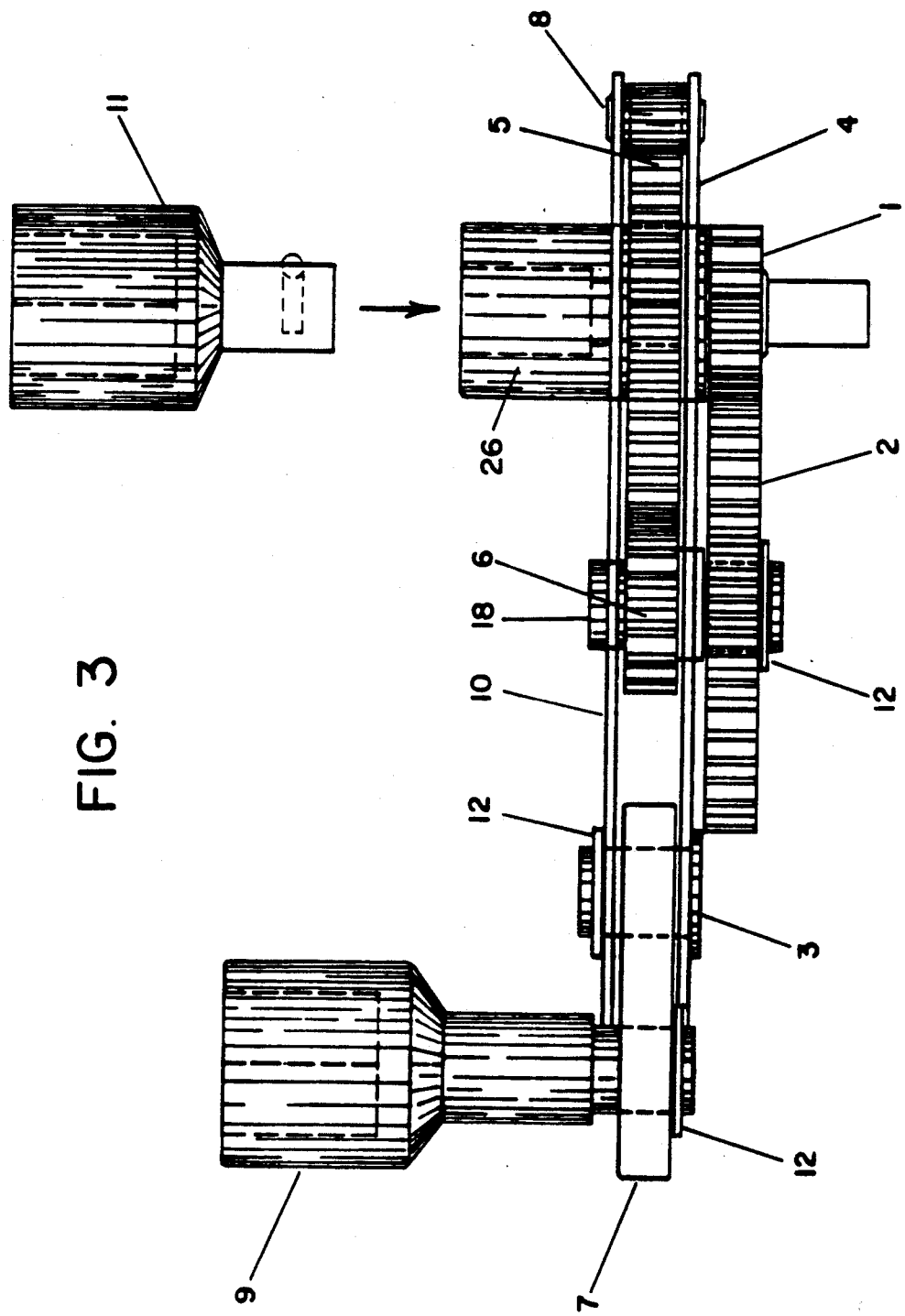
FIG. 3 is a top view of the device of FIG. 1.

In the preferred form depicted, the means for anchoring the device in position during use comprise holding socket or cup support 9 pivotally mounted on arm 7 which in turn is pivotally mounted between plates 4 and 10 on shaft or pivot pin 3. Pin 3 extends through aperture 32 in plate 4 and aperture 33 in plate lo and is held in place at one end by a retainer 12 or equivalent means such a cotter pin, and at the other end by an oversized head flange 35. As indicated by arrow 36 in FIG. 1, this sub-assembly enables arm 7 and holding socket 9 to be rotated to different positions so that the linear distance between the axis of holding socket 9 and the axis of output socket 11 (note FIG. 3) can be adjusted.

Figure 10:
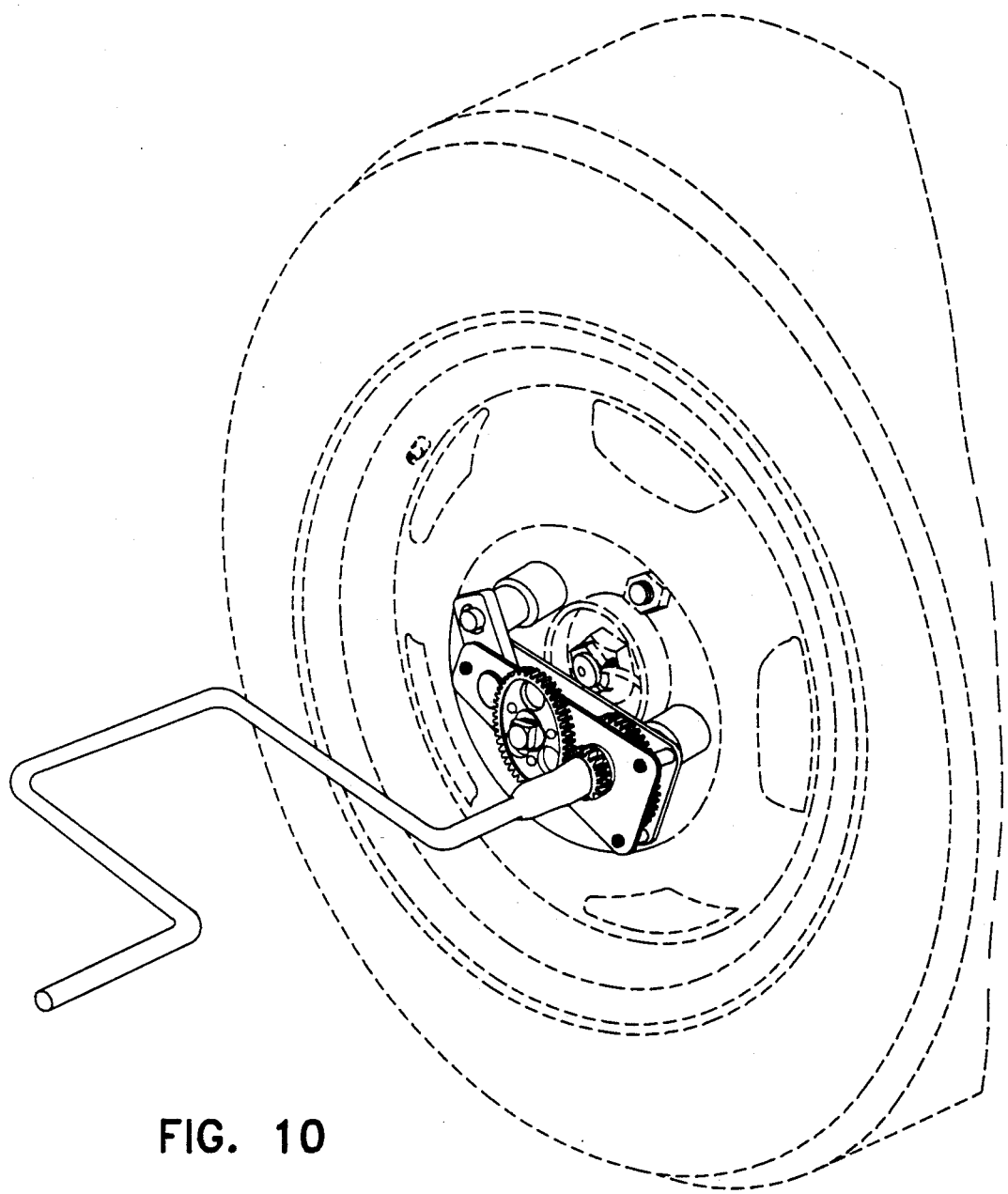
FIG. 10 depicts the use of a device of this invention in removing or tightening a wheel lug nut of an automotive vehicle.

When used to loosen or tighten wheel lugs, the device in the forms depicted is mounted on the wheel such that the output socket 11 is on the wheel lug to be loosened or tightened and the holding socket 9 is on another wheel lug, input torque is applied to the first gear wheel for example by use of crank 13 and the amplified torque from the device is thereby transmitted through the gearing and applied to the lug to be loosened or tightened by the output socket. The use of the device in this manner is well depicted in FIG. 10. As noted above, the gearing of the device is such as to enable the achievement of substantial output torque from the input of modest torque, as by a physically weak or infirm person. For example, torque applied to gear wheel 1 can be amplified as torque from gear wheel 5 by as much as 600% or more in a small, portable device of this invention.

Figure 11:
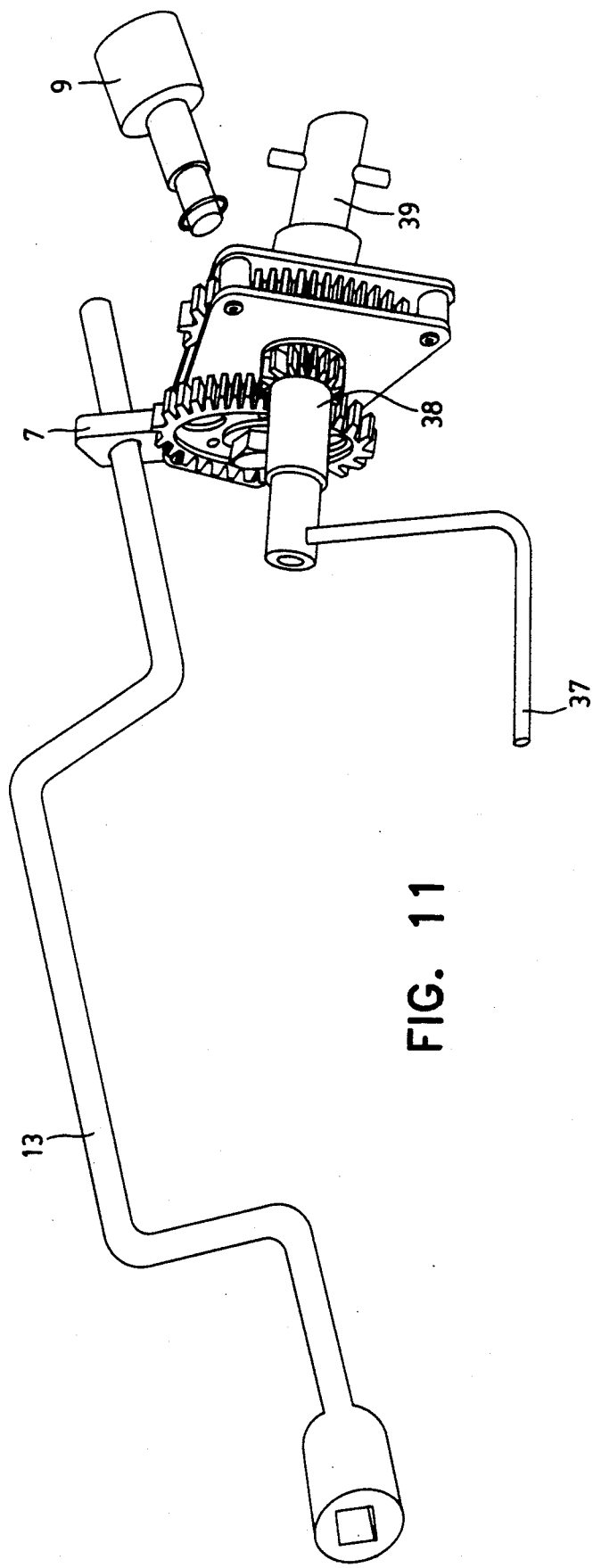
FIG. 11 depicts a device of this invention when adapted for use in rotating a rotatable mechanical jack.
Figure 12:
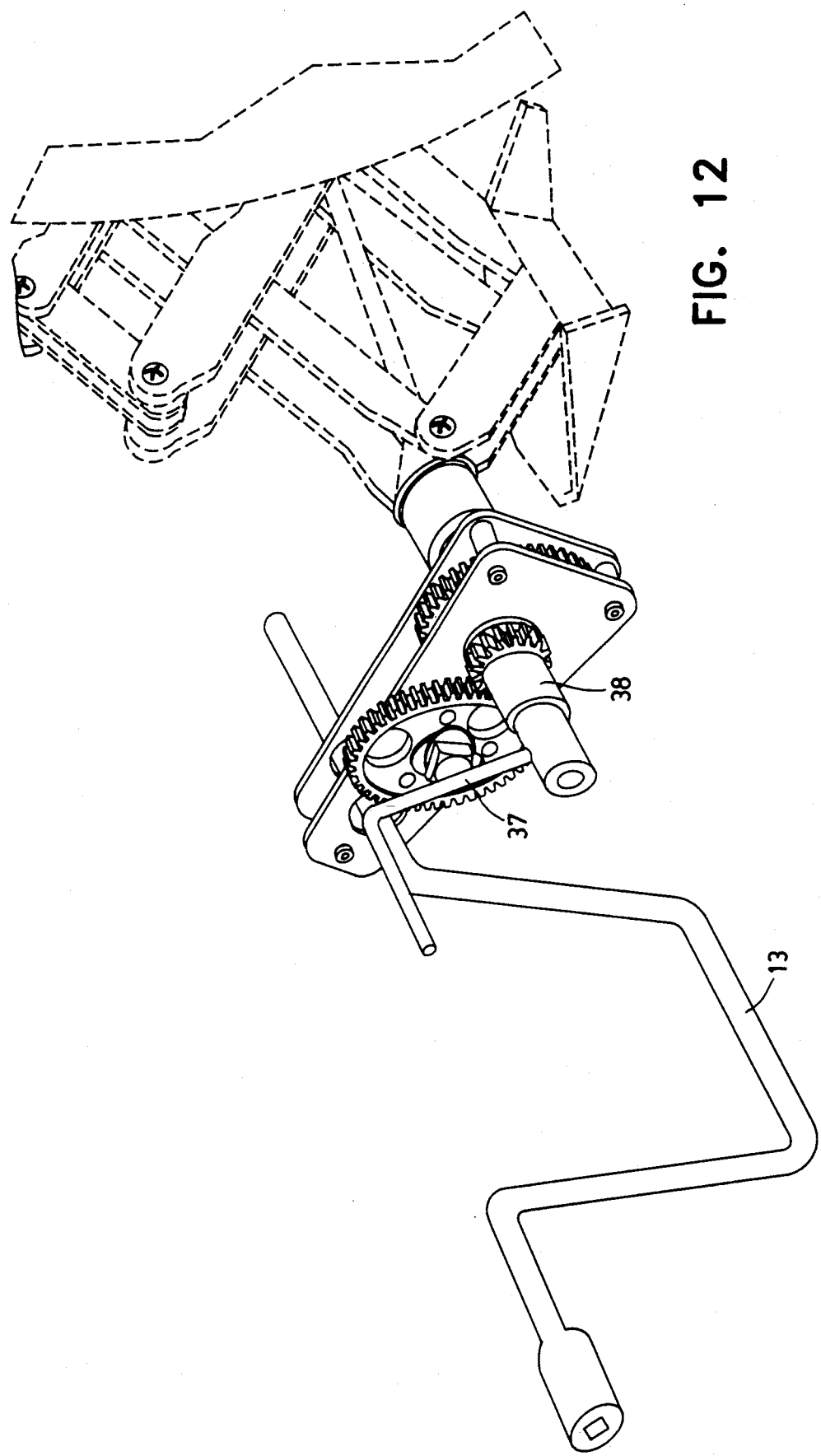
FIG. 12 depicts the use of the device of FIG. 10 in rotating a rotatable mechanical jack.

FIGS. 11 and 12 depict use of the device in the form depicted to crank a mechanical jack. As seen from FIG. 11, holding socket or cup support 9 is removed from arm 7 and an end portion of crank 13, preferably with socket 25 removed therefrom, is inserted into the aperture in arm 7 which normally pivotally accommodates holding socket or cup support 9. An auxiliary crank 37 having an appropriately configured socket head 38 is applied to lug 31 of gear wheel 1, and output socket 11 is, if necessary, replaced by an appropriately configured auxiliary attachment member 39 to establish rotatable connection with the jack. With the device so connected, and the foot of the user applied to crank 13 (note FIG. 12), auxiliary crank 37 is employed to raise or lower the jack. Here again the mechanical advantage achieved by the gearing of the device enables this operation to be conducted without requiring much physical force or exertion, even when jacking up heavy vehicles.

This invention is susceptible to considerable variation in its practice and modes of construction. Thus this invention is not intended to be limited by, nor limited to, the illustrative exemplifications presented hereinabove. Rather, the subject matter to which this invention is intended to apply is within the spirit and scope of the appended claims.

I claim:

1. A device adapted for increasing rotary torque, which device comprises:
   (a) at least two laterally disposed plates in spaced-apart substantially parallel planar alignment defining a space therebetween;
   (b) gearing adapted to receive and amplify an input rotary torque, and to provide an amplified output rotary torque, at least a portion of said gearing being disposed within said space;
   (c) means for applying input rotary torque to said gearing;
   (d) means, including an output socket having an axis, for delivering amplified output rotary torque from said gearing to an object to be rotated;
   (e) an arm having an inner end portion, said arm being pivotally supported at said inner end portion within said space at a locus such that a portion of said arm extends beyond the edge of said plates; and
   (f) a holding socket having an axis, for anchoring the device in one or more operating spatial positions during application of the input rotary torque, said holding socket being attached to said portion of said arm that extends beyond the edge of said plates such that the linear distance between the axis of said holding socket and the axis of said output socket is adjustable by rotation of said pivotally supported arm.

2. A device as claimed in claim 1 wherein said output socket is detachably attachable to said gearing.

3. A device as claimed in claim 1 wherein said gearing comprises (1) a first gear wheel adapted to receive said input rotary torque; (2) a second gear wheel and a third gear wheel mounted on a shaft perpendicular to said plates and adapted to rotate in unison with said shaft; (3) a fourth gear wheel adapted to deliver said output rotary torque; said device being further characterized in that (4) said second gear wheel is adapted to be rotated by torque from said first gear wheel and has a larger diameter than said first gear wheel; and (5) said fourth gear wheel is adapted to be rotated by torque from said third gear wheel and has a larger diameter than said third gear wheel.

4. A device as claimed in claim 3 wherein said second gear wheel has a larger diameter than said third gear wheel.

5. A device as claimed in claim 3 wherein said first gear wheel and said fourth gear wheel are axially aligned, wherein the diameters of said first gear wheel and said third gear wheel are equal to each other, and wherein the diameters of said second gear wheel and said fourth gear wheel are equal to each other.

6. A device as claimed in claim 3 wherein said means for applying input rotary torque is connected to said first gear wheel.

7. A device as claimed in claim 6 wherein said means for applying an input torque to said first gear wheel comprises a lug adapted to be rotated by a member detachably attached thereto.

8. A device as claimed in claim 7 wherein said member detachably attachable to said lug comprises a socket adapted to be rotated by a hand or motor-operated crank.

9. A device as claimed in claim 3 wherein said output socket is connected to said fourth gear wheel.

10. A device as claimed in claim 9 wherein said output socket is adapted to be detachably connected to said device and rotated by torque delivered by said fourth gear wheel.

11. A device as claimed in claim 9 wherein said output socket is adapted to be (a) detachably secured to said device, (b) detachably secured onto a wheel lug of an automotive vehicle, and (c) rotated by torque delivered by said fourth gear wheel.

12. A device for loosening or tightening a wheel lug, which device comprises:
   (a) at least two laterally disposed plates in spaced-part substantially parallel planar alignment defining a space therebetween;
   (b) gearing adapted to receive and amplify an input rotary torque, and to provide an amplified output rotary torque, at least a portion of said gearing being disposed within said space;
   (c) means for applying input rotary torque to said gearing;
   (d) means, including an output socket having an axis, for delivering amplified output rotary torque from said gearing to the wheel lug to be loosened or tightened;
   (e) an arm having an inner end portion, said arm being pivotally supported at said inner end portion within said space at a locus such that a portion of said arm extends beyond the edge of said plates; and (f) a holding socket having an axis, for anchoring the device in at least one operating spatial position onto a wheel lug other than the wheel lug to be loosened or tightened during application of the input rotary torque, and holding socket being attached to said portion of said arm that extends beyond the edge of said plates such that the linear distance between the axis of said holding socket and the axis of said output socket is adjustable by rotation of said pivotally supported arm.

* * * * *